United States Patent
Inaba et al.

(10) Patent No.: US 10,987,802 B2
(45) Date of Patent: Apr. 27, 2021

(54) CONTROL DEVICE

(71) Applicant: FANUC CORPORATION, Yamanashi (JP)

(72) Inventors: Ryoutarou Inaba, Yamanashi-ken (JP); Hisashi Momotani, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 205 days.

(21) Appl. No.: 16/386,350

(22) Filed: Apr. 17, 2019

(65) Prior Publication Data
US 2019/0321970 A1 Oct. 24, 2019

(30) Foreign Application Priority Data

Apr. 19, 2018 (JP) .............................. JP2018-080317

(51) Int. Cl.
| | | |
|---|---|---|
| *B25J 9/00* | (2006.01) | |
| *B25J 9/16* | (2006.01) | |
| *G05B 19/414* | (2006.01) | |
| *B25J 19/06* | (2006.01) | |

(52) U.S. Cl.
CPC ............. *B25J 9/161* (2013.01); *B25J 9/1674* (2013.01); *B25J 19/06* (2013.01); *G05B 19/414* (2013.01); *G05B 2219/39097* (2013.01)

(58) Field of Classification Search
CPC . B25J 9/161; B25J 9/1674; B25J 19/06; B25J 19/0054; B25J 19/0004; B25J 9/1602; G05B 19/414; G05B 2219/39097
See application file for complete search history.

(56) References Cited

U.S. PATENT DOCUMENTS

| | | |
|---|---|---|
| 5,926,389 A | 7/1999 | Trounson |
| 6,809,494 B1 | 10/2004 | Hattori et al. |
| 2008/0091309 A1* | 4/2008 | Walker .................. B60T 8/4266 701/1 |
| 2014/0142732 A1* | 5/2014 | Karvonen .......... A63B 24/0087 700/91 |

FOREIGN PATENT DOCUMENTS

| | | |
|---|---|---|
| CN | 206149700 U | 5/2017 |
| JP | H05019826 A | 1/1993 |
| JP | 8205556 A | 8/1996 |

(Continued)

OTHER PUBLICATIONS

English Abstract and Machine Translation for Japanese Publication No. 2006-146464 A, published Jun. 8, 2006, 5 pgs.

(Continued)

*Primary Examiner* — Ian Jen
(74) *Attorney, Agent, or Firm* — Fredrikson & Byron, P.A.

(57) ABSTRACT

A control device includes: a casing; a communication board configured in a plate shape; a control board configured in a plate shape and having one side attached to the communication board; an amplifier board configured in a plate shape and having one side attached to the communication board and provided with a power module for driving an actuator of a robot; and a brake power supply unit disposed opposite the communication board across the amplifier board and configured to drive an electromagnetic brake of the actuator.

8 Claims, 2 Drawing Sheets

(56) References Cited

FOREIGN PATENT DOCUMENTS

| JP | 2006146464 A | 6/2006 |
|---|---|---|
| JP | 2012206241 A | 10/2012 |
| JP | 2014104573 A | 6/2014 |
| WO | 0237663 A1 | 5/2002 |
| WO | 2016063353 A1 | 4/2016 |

OTHER PUBLICATIONS

English Abstract and Machine Translation for Japanese Publication No. 08-205556 A, published Aug. 9, 1996, 11 pgs.
English Abstract and Machine Translation for Japanese Publication No. JPH05-019826A, published Jan. 29, 1993, 7 pgs.
English Abstract and Machine Translation for Japanese Publication No. JP2012-206241A, published Oct. 25, 2012, 17 pgs.
English Abstract and Machine Translation for Japanese Publication No. JP2014-104573A, published Jun. 9, 2014, 15 pgs.
English Abstract and Machine Translation for International Publication No. WO2016/063353A1, published Apr. 28, 2016, 25 pgs.
English Abstract and Machine Translation for Chinese Publication No. CN206149700U, published May 3, 2017, 7 pgs.

* cited by examiner

CONTROL DEVICE

CROSS-REFERENCE TO RELATED APPLICATION

This application is based upon and claims the benefit of priority from Japanese Patent Application No. 2018-080317 filed on Apr. 19, 2018, the contents of which are incorporated herein by reference.

BACKGROUND OF THE INVENTION

Field of the Invention

The present invention relates to a control device in which a control board with electronic components mounted thereon is housed in a casing.

Description of the Related Art

Japanese Laid-Open Patent Publication No. 2006-146464 discloses a robot control device having a servo control board and a brake control board.

SUMMARY OF THE INVENTION

The technique described in Japanese Laid-Open Patent Publication No. 2006-146464 entails a problem of enlargement of the control device having a servo control board and a brake control board because these boards supply electric power to the manipulator and hence include relatively large circuits thereon.

The present invention has been devised to solve the above problem, it is therefore an object of the present invention to provide a control device capable of being downsized.

A control device according to a first aspect of the present invention includes: a casing; a communication board configured in a plate shape; a control board configured in a plate shape and having one side attached to the communication board; an amplifier board configured in a plate shape and having one side attached to the communication board and provided with a power module for driving an actuator of an appliance; and a brake power supply unit disposed opposite the communication board across the amplifier board and configured to drive an electromagnetic brake of the actuator.

According to the present invention, it is possible to downsize the control device.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Configuration of Robot and Control Device]

Figure 1:
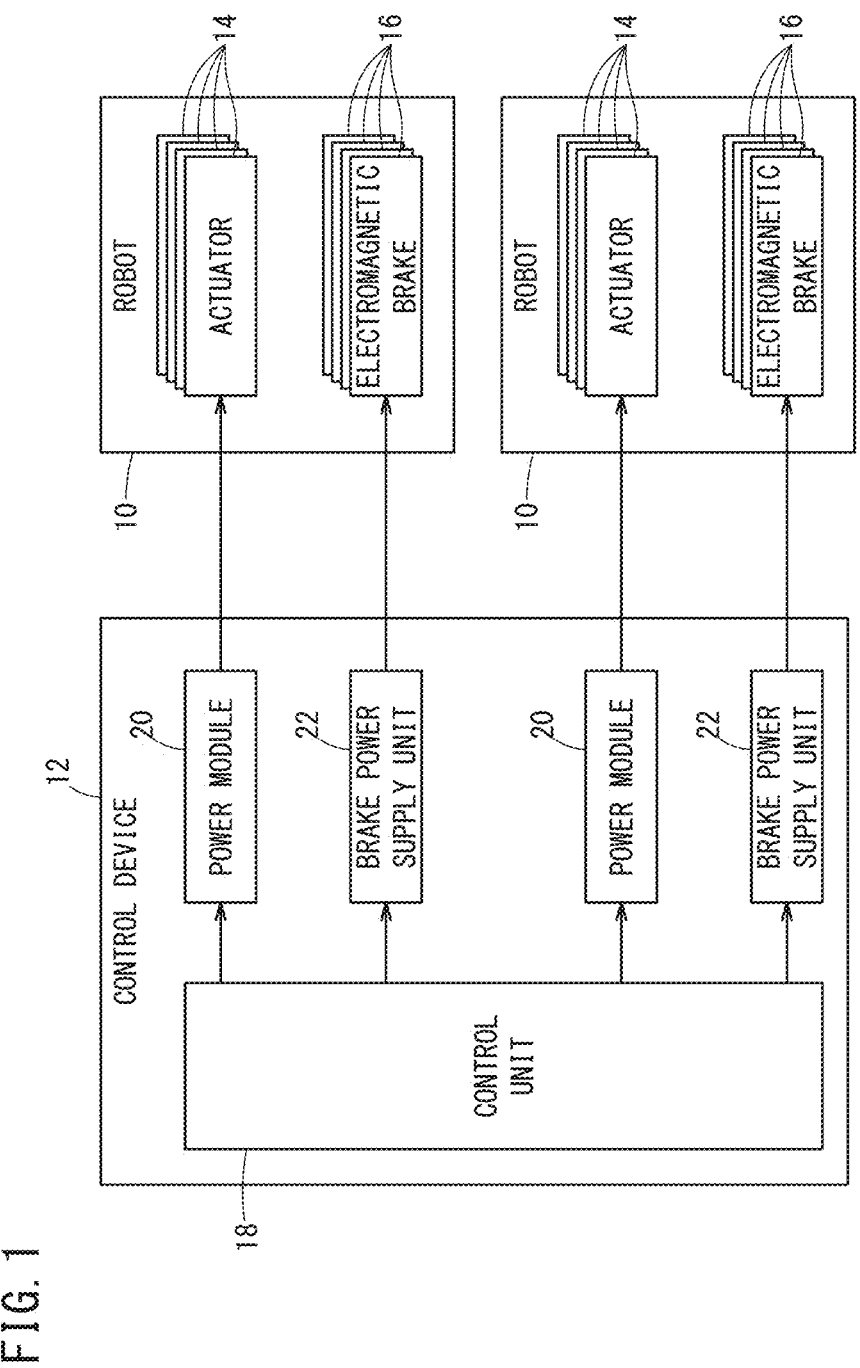
FIG. 1 is a block diagram showing a robot and a control device for controlling the robot.

FIG. 1 is a block diagram showing a robot 10 and a control device 12 for controlling the robot 10. The robot 10 is an articulated robot such as a SCARA robot, a parallel link robot or the like, and has, for example, four drive shafts. The robot 10 constitutes an appliance, and has an actuator 14 such as a servomotor or the like for each of the drive shafts. That is, the robot 10 has four actuators 14. Some of the actuators 14 are provided with an electromagnetic brake 16. The electromagnetic brake 16 applies the brake on the drive shaft of the actuator 14 when not energized and releases the brake from the drive shaft of the actuator 14 when energized.

The control device 12 includes: a control unit 18 for computing command values for the robot 10 based on a program stored in a storage unit (not shown); power modules 20 for supplying power to each actuator 14 of the robot 10 according to a command value; and brake power supply units 22 for supplying electric power to the electromagnetic brakes 16 to energize them when driving the actuators 14. In the control device 12 of the present embodiment, one power module 20 supplies electric power to four actuators 14 of one robot 10, and one brake power supply unit 22 supplies electric power to four electromagnetic brakes 16 of one robot 10. The control device 12 has two sets of the power module 20 and the electromagnetic brake 16 to control two robots 10.

[Details of Control Device]

Figure 2:
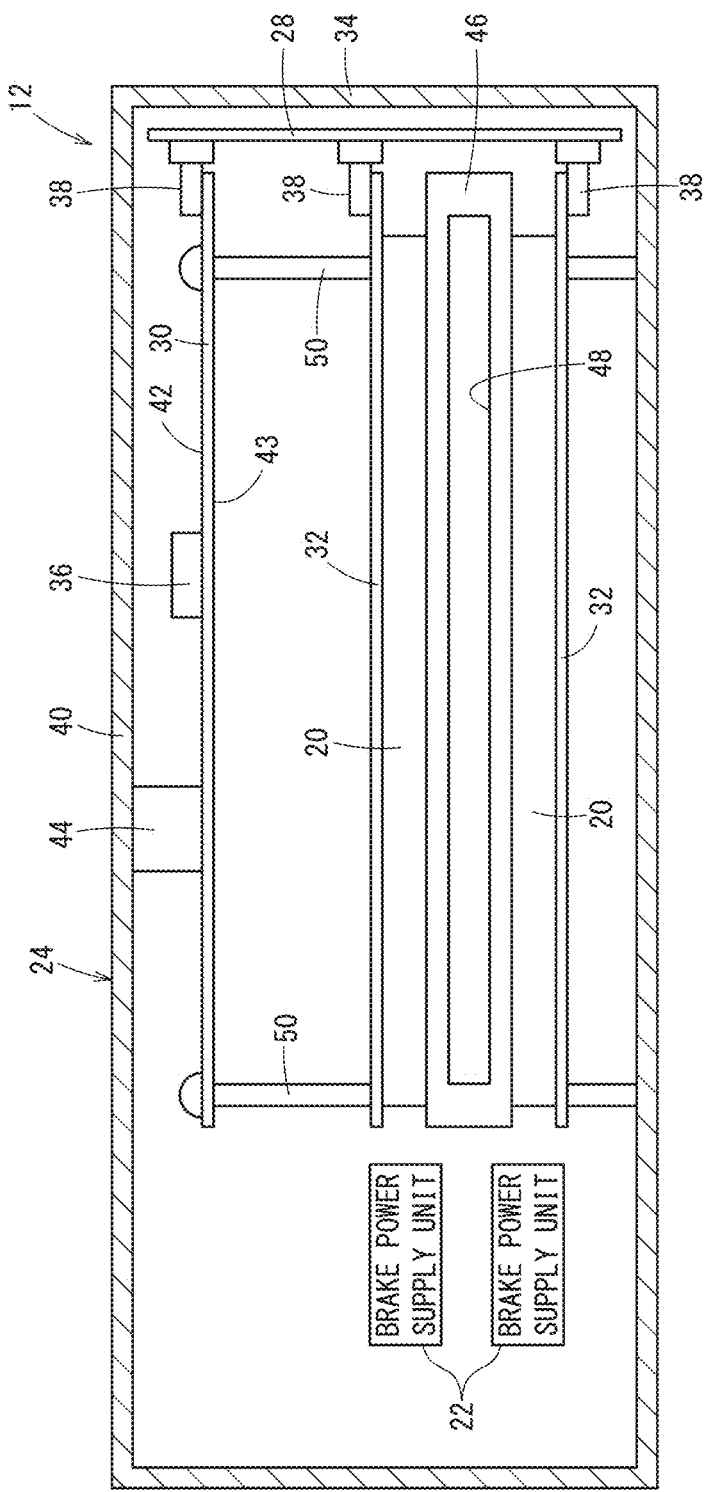
FIG. 2 is a schematic diagram showing a configuration of a control device.

FIG. 2 is a schematic diagram showing a configuration inside a casing 24 of the control device 12. The control device 12 includes, inside the casing 24, a communication board 28, a control board 30 attached to the communication board 28, two amplifier boards 32 attached to the communication board 28, and two brake power supply units 22.

The communication board 28 exchanges signals between the control board 30 and the amplifier boards 32. The communication board 28 is formed in a substantially rectangular plate shape.

Various electronic components 36 are mounted on the control board 30. The control board 30 and the electronic components 36 constitute the above-described control unit 18. The control board 30 is formed in a substantially rectangular plate shape, and one side of the control board 30 is connected to the communication board 28 via a floating connector 38. A protection member 44 formed of acrylic resin or the like is fitted on a first surface 42 of the control board 30 facing a second inner side surface 40 of the casing 24 of the control board 30. The protection member 44 is formed so as to have a height from the first surface 42 of the control board 30 greater than the height of the electronic component 36, which is mounted on the first surface 42, from the first surface 42.

Each amplifier board 32 is provided with a power module 20 that controls power supplied to the robot 10. The amplifier board 32 is formed in a substantially rectangular plate shape, and one side of the amplifier board 32 is connected to the communication board 28 via a floating connector 38. The amplifier boards 32 are disposed on the second surface 43 side which is the back side of the first surface 42 of the control board 30. The power module 20 mounted on one amplifier board 32 supplies power to four actuators 14 of one robot 10. The control device 12 has two amplifier boards 32, whereby electric power is supplied to the actuators 14 of the two robots 10. The amplifier board 32 is fixed to the inner side surface of the casing 24. The power module 20 may be configured as a unit which is mounted on the amplifier board 32. Alternatively, the power module 20 may be constituted by components directly provided on the amplifier board 32.

The brake power supply units 22 are disposed adjacent to the amplifier boards 32 and on the opposite side of the communication board 28 across the amplifier boards 32. Each brake power supply unit 22 supplies electric power to the electromagnetic brakes 16 provided for four actuators 14 of one robot 10. The control device 12 includes the same number of brake power supply units 22 as that of the amplifier boards 32.

The two amplifier boards 32 are arranged so that the power modules 20 face each other. A single heat sink 46 is provided between the two power modules 20. The heat sink 46 is made of aluminum or the like. The heat sink 46 is fixed to each of the power modules 20. The heat sink 46 has a hollow portion 48 therein, and the hollow portion 48 is opened in a direction crossing the direction in which the power modules 20 face each other. More preferably, the hollow portion 48 opens not toward the brake power supply unit 22 and the communication board 28.

The control board 30 and one of the amplifier boards 32 arranged on the side closer to the control board 30 are connected by connecting members 50. As described above, since the heat sink 46 is fixed to the two power modules 20, the control board 30 and the two amplifier boards 32 can be integrally inserted into the casing 24 and connected to the communication board 28.

In the present embodiment, the control device 12 is provided with two amplifier boards 32, but may include only one or three or more. When the number of the amplifier boards 32 is odd, the heat sink 46 is not necessarily arranged between the two power modules 20.

In the present embodiment, the protection member 44 is provided on the control board 30. Similarly, the protection member 44 may be provided on the face of the communication board 28 opposing a first inner side surface 34 of the casing 24. The communication board 28 may have electronic components provided thereon. It should be noted that the protection member 44 may be provided only on the control board 30, only on the communication board 28, or on both the control board 30 and the communication board 28.

Though in the present embodiment, one brake power supply unit 22 supplies electric power to the electromagnetic brakes 16 of the multiple actuators 14 of one robot, a single brake power supply unit 22 can supply electric power to the electromagnetic brakes 16 of the actuators 14 of multiple robots 10. That is, the total number of the actuators 14 driven by the power module 20 mounted on the amplifier board 32 needs only to be equal to the total number of the electromagnetic brakes 16 driven by the brake power supply unit 22. In some robots, part of actuators 14 does not have an electromagnetic brake 16. In such a case, the total number of electromagnetic brakes 16 that can be driven by the brake power supply unit 22 needs only to be equal to the total number of the electromagnetic brakes of the robot 10.

[Operation and Effect]

Among the constituents of the control device 12, the amplifier board 32 on which the power module 20 for supplying power to the actuator 14 is mounted and the brake power supply unit 22 that supplies power to the electromagnetic brake 16 are relatively large in volume, causing the increase in size of the control device 12.

In the present embodiment, the brake power supply units 22 are arranged adjacent to the amplifier boards 32 and opposite the communication board 28 across the amplifier boards 32. Since the amplifier boards 32 and the brake power supply units 22, occupying relatively large space, are arranged together inside the casing 24, it is possible to reduce the size of the control device 12.

Further, in the present embodiment, the protection member 44 formed of acrylic resin or the like is arranged on the first surface 42 of the control board 30. The protection member 44 is formed so as to have a height from the first surface 42 of the control board 30 greater than the height of the electronic component 36, which is mounted on the first surface 42, from the first surface 42. Therefore, if the casing 24 is deformed by external pressure or the like, or when the control board 30 vibrates, the protection member 44 comes into contact with the second inner side surface 40 of the casing 24, whereby it is possible to prevent damage to the electronic component 36. In addition, deformation of the control board 30 is suppressed so that it is possible to reduce stress acting on the control board 30 and the electronic component 36. Further, when there are parts mounted on the control board 30 and connected to connectors and sockets, disconnection can be prevented. Moreover, the influence of the vibration of the control board 30 on the communication board 28 connected to the control board 30 and the amplifier board 32 connected via the communication board 28 can be reduced.

Further, in the present embodiment, the power module 20 mounted on the amplifier board 32 drives four actuators 14 provided for one robot 10, and the brake power supply unit 22 drives the electromagnetic brakes 16 of the four actuators 14 provided for one robot 10. Therefore, by mounting multiple amplifier boards 32, it is possible with one control device 12 to control as many robots 10 as the amplifier boards 32. In comparison with the case of using multiple control devices 12, a single control board 30 can be shared so that cooperative operations of individual actuators 14 of multiple robots 10 can be easily performed. Also, since the electromagnetic brakes 16 of the actuators 14 provided for the multiple robots 10 can be controlled by the single control device 12, it is easy to perform cooperative operations of individual electromagnetic brakes 16 of the multiple robots 10.

In the present embodiment, a pair of amplifier boards 32 are arranged as a set so that the power modules 20 oppose each other with a single heat sink 46 interposed between therebetween. Thereby, two power modules 20 can be cooled by the single heat sink 46; hence the control device 12 can be downsized.

Further, in the present embodiment, the hollow portion 48 formed in the heat sink 46 opens in a direction crossing the direction in which the power modules 20 face each other and the hollow portion 48 communicates with the outside of the casing 24. That is, a hermetically enclosed space defined by the outer peripheral surface of the hollow portion 48 and the inner peripheral surface of the casing 24 is formed. As a result, the hollow portion 48 of the heat sink 46 can be separated from part of the space inside the casing 24 located on the outer peripheral side of the heat sink 46. Therefore, even if the control device 12 is used in a highly polluted environment, external air is sent into only the hollow portion 48 of the heat sink 46, so that it is possible to prevent the external air from entering the space inside the casing 24. Thereby, cool air is supplied into the hollow portion 48 to enhance the cooling effect of the power modules 20 while a clean environment can be maintained in the space where the electronic component 36 and the like are disposed. Thus, as compared with a case where the whole device, including the heat sink 46 is hermetically sealed, it is possible to enhance the cooling effect of the power modules 20 and to downsize the control device 12.

Moreover, in the present embodiment, the control board 30 and the one of the amplifier boards 32, which is arranged closer to the control board 30, are connected by the connecting members 50. The heat sink 46 is fixed to each of the power modules 20. Thereby, the control board 30 and the two amplifier boards 32 can be integrated, inserted into the casing 24, and connected to the communication board 28.

[Technical Idea Obtained from the Embodiment]

Technical ideas that can be grasped from the above embodiment will be described below.

A control device (12) includes: a casing (24); a communication board (28) configured in a plate shape; a control board (30) configured in a plate shape and having one side attached to the communication board (28); an amplifier board (32) configured in a plate shape and having one side attached to the communication board (28) and provided with a power module (20) for driving an actuator (14) of an appliance (10); and a brake power supply unit (22) disposed opposite the communication board (28) across the amplifier board (32) and configured to drive an electromagnetic brake (16) of the actuator (14). Thus, this configuration makes it possible to downsize the control device (12).

The above control device (12) may be configured such that the control board (30) is disposed such that one surface thereof faces an inner side surface of the casing (24), an electronic component (36) is provided on the one surface of the control board (30), and a protection member (44) is configured to have a height from the one surface of the control board (30) greater than the height of the electronic component (36) mounted on the one surface. This configuration makes it possible to suppress damage to the electronic component (36).

The above control device (12) may be configured such that the communication board (28) is disposed such that one surface thereof faces an inner side surface of the casing (24), an electronic component (36) is provided on the one surface of the communication board (28), and a protection member (44) has a height from the one surface of the communication board (28) greater than the height of the electronic component mounted on the one surface. This configuration makes it possible to suppress damage to the electronic component (36).

The above control device (12) may be configured such that the power module (20) provided on the amplifier board (32) drives a plurality of the actuators (14) of the single appliance (10), and the brake power supply unit (22) drives the electromagnetic brakes (16) of a plurality of the actuators (14) of the single appliance. This makes it possible to downsize the control device (12).

The above control device (12) may comprise a plurality of the amplifier boards (32), in which the total number of the electromagnetic brakes (16) driven by the brake power supply unit (22) is equal to the total number of the electromagnetic brakes (16) of the one or more actuators (14) driven by the power module (20). This makes it possible to downsize the control device (12).

The above control device (12) may be configured such that the amplifier boards (32) is arranged such that two amplifier boards (32) are paired and the power module thereof face each other, and a single heat sink (46) is provided between the facing power modules (20). This makes it possible to downsize the control device (12).

The above control device (12) may be configured such that the heat sink (46) has a hollow portion (48) formed therein, the hollow portion (48) is opened in a direction crossing the direction in which the power modules (20) face each other, and a hermetically sealed space is formed by the outer peripheral surface of the heat sink (46) and the inner side surface of the casing (24). Thereby, it is possible to improve the cooling performance of the power module (20).

The control device (12) may be configured such that a connecting member (50) connecting the control board (30) and at least one of the amplifier boards (32) is provided. This enables the control board (30) and the amplifier board (32) to be integrated and inserted into the casing (24) and connected to the communication board (28).

The present invention is not limited to the above-described embodiment, and various modifications can be made without departing from the gist of the present invention.

What is claimed is:

1. A control device comprising:
   a casing;
   a communication board configured in a plate shape;
   a control board configured in a plate shape and having one side attached to the communication board;
   an amplifier board configured in a plate shape and having one side attached to the communication board and provided with a power module for driving an actuator of an appliance; and
   a brake power supply unit disposed opposite the communication board across the amplifier board and configured to drive an electromagnetic brake of the actuator.

2. The control device according to claim 1, wherein:
   the control board is disposed such that one surface thereof faces an inner side surface of the casing;
   an electronic component is provided on the one surface of the control board; and
   a protection member is configured to have a height from the one surface of the control board greater than the height of the electronic component mounted on the one surface.

3. The control device according to claim 1, wherein:
   the communication board is disposed such that one surface thereof faces an inner side surface of the casing;
   an electronic component is provided on the one surface of the communication board; and
   a protection member is configured to have a height from the one surface of the communication board greater than the height of the electronic component mounted on the one surface.

4. The control device according to claim 1, wherein:
   the power module provided on the amplifier board is configured to drive a plurality of the actuators of the single appliance; and
   the brake power supply unit is configured to drive the electromagnetic brakes of a plurality of the actuators of the single appliance.

5. The control device according to claim 1, comprising a plurality of the amplifier boards, wherein the total number of the electromagnetic brakes driven by the brake power supply unit is equal to the total number of the electromagnetic brakes of the one or more actuators driven by the power module.

6. The control device according to claim 5, wherein: the amplifier boards are arranged such that two amplifier boards are paired and the power module thereof face each other;
   a single heat sink is provided between the facing power modules.

7. The control device according to claim 6, wherein:
   the heat sink is configured to have a hollow portion formed therein;

the hollow portion is opened in a direction crossing the direction in which the power modules face each other; and a hermitically sealed space is formed by an outer peripheral surface of the heat sink and an inner side surface of the casing.

8. The control device according to claim 1, wherein a connecting member connecting the control board and at least one of the amplifier boards is provided.

\* \* \* \* \*